United States Patent
England et al.

(10) Patent No.: US 10,129,754 B2
(45) Date of Patent: Nov. 13, 2018

(54) REAL TIME DIGITAL ISSUANCE OF RESOURCES

(71) Applicant: BANK OF AMERICA CORPORATION, Charlotte, NC (US)

(72) Inventors: Tony England, Tega Cay, SC (US); Elizabeth A. Price, Newport, TN (US); Shyam Kumar Agrawal, Santa Clarita, CA (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 176 days.

(21) Appl. No.: 15/253,672

(22) Filed: Aug. 31, 2016

(65) Prior Publication Data

US 2018/0063118 A1    Mar. 1, 2018

(51) Int. Cl.
*H04W 12/08* (2009.01)
*H04L 29/08* (2006.01)

(52) U.S. Cl.
CPC ............. *H04W 12/08* (2013.01); *H04L 67/00* (2013.01)

(58) Field of Classification Search
CPC . H04L 63/083; H04L 63/0884; H04L 63/102; H04L 63/123; H04W 12/06; H04W 12/08
See application file for complete search history.

(56) References Cited

U.S. PATENT DOCUMENTS

| | | | |
|---|---|---|---|
| 5,212,373 A | 5/1993 | Fujioka et al. |
| 5,274,221 A | 12/1993 | Matsubara et al. |
| 5,530,232 A | 6/1996 | Taylor |
| 5,577,109 A | 11/1996 | Stimson et al. |
| 5,578,808 A | 11/1996 | Taylor et al. |
| 5,621,787 A | 4/1997 | McKoy et al. |
| 5,704,046 A | 12/1997 | Hogan |
| 5,721,768 A | 2/1998 | Stimson et al. |
| 5,760,381 A | 6/1998 | Stich et al. |
| 5,878,337 A | 3/1999 | Joao et al. |
| 5,903,830 A | 5/1999 | Joao et al. |
| 5,991,748 A | 11/1999 | Taskett et al. |
| 5,996,076 A | 11/1999 | Rowney et al. |
| 6,021,943 A | 2/2000 | Chastain et al. |
| 6,032,859 A | 3/2000 | Muehlberger et al. |
| 6,047,270 A | 4/2000 | Joao et al. |
| 6,529,725 B1 | 3/2003 | Joao et al. |
| 7,249,092 B2 | 7/2007 | Dunn et al. |

(Continued)

*Primary Examiner* — Oleg Korsak
(74) *Attorney, Agent, or Firm* — Michael A. Springs; Moore & Van Allen PLLC; James C. Edwards

(57) ABSTRACT

Systems and devices are provided for real-time digital issuance/provisioning of digital resources. In accordance with embodiments of the invention, real-time provisioning of the digital resources occurs through access to a mobile application. In specific embodiments in which the user does not currently have authorization to use the mobile application, an authorization code is issued to a user and inputted via the mobile application as a means for verifying the identity of the user prior to provisioning the digital resource to the digital storage.

As such, by having the provisioning occur electronically via the mobile application provisioning of the digital resource is highly secure, in that, provisioning occurs without the user possessing or having knowledge of the digital resource credentials prior to provisioning.

13 Claims, 4 Drawing Sheets

(56) References Cited

U.S. PATENT DOCUMENTS

2002/0002579 A1    1/2002   Holden et al.
2006/0278704 A1   12/2006   Saunders et al.
2015/0046339 A1*   2/2015   Wong .................... G06Q 20/382
                                                                                           705/71

\* cited by examiner

REAL TIME DIGITAL ISSUANCE OF RESOURCES

FIELD OF THE INVENTION

The present invention is related to digital resources and, more specifically, systems and devices for real-time issuance of digital resources.

SUMMARY

The following presents a simplified summary of one or more embodiments in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing for real-time digital issuance of digital resources. Real-time provisioning of the digital resource occurs through a user's access to a mobile application. As such, by having the provisioning occur electronically via the mobile application provisioning of the digital resource is highly secure, in that, provisioning occurs without having to provide the digital resources credentials to the user.

In the event that the user is not enrolled or otherwise currently authorized to use the mobile application, the user is provided with an authorization code, which they are required to input, typically along with some form of user credentials, in order to verify their identity for the purpose of provisioning the digital resource to their digital storage. Once the user has accessed the mobile application and requested provisioning of the digital resource to their storage, the digital resource credentials are communicated to the mobile application, which in turn communicates the digital resource credentials to the digital storage. The digital storage communicates the digital resource credentials to a digital resource network, which issues and communicates a token associated with the digital resource credentials to the digital storage that serves to activate the digital resource for use.

A system for real-time provisioning of a digital resource to a digital storage defines first embodiments of the invention. The system includes a computing device that includes a first computing platform having a first memory and a first processor in communication with the memory. The system additionally includes a digital resource provisioning module that is stored in the memory and executable by the processor. The provisioning module is configured to (i) receive a first input that requests real-time provisioning of a digital resource to a digital storage associated with a user, and (ii) in response to receiving the request, communicate a provisioning command to a mobile application associated with the user. In addition, the system includes a mobile communication device including a second computing platform having a second memory and a second processor in communication with the memory. Additionally, the system includes a mobile application stored in the memory, executable by the processor and configured to, in response to being receiving the provisioning command, receive a second input from the user that prompts the digital resource provisioning module to provision the digital resource to the digital storage. Moreover, the system includes a digital storage that is stored in the second memory, and executable by the second processor. The digital storage is configured to, in response to the second input from the user at the mobile application, provide for activation of the digital resource.

In specific embodiments of the system, the digital resource provisioning module is further configured to determine whether the user is currently enrolled to use the mobile application. In related embodiments of the system, the digital resource provisioning module is further configured to, in response to determining that the user is not currently enrolled to use the mobile application, generate and communicate to the user an authorization code. In further related embodiments of the system, the mobile application is further configured to (i) in response to the provisioning module determining that the user is not currently enrolled to use the mobile application, receive the second input from the user, wherein the second input includes the authorization code and at least one user credential, and (ii) communicate the authorization and user credential to a verification entity. In still further related embodiments of the system, the digital resource provisioning module is further configured to, in response to receiving notification of successful verification from the verification entity, initiate provisioning of the digital resource to the digital storage.

In still further specific embodiments of the system, the digital resource provisioning module is further configured, in response to receiving the second input at the mobile application, communicate digital resource credentials to the mobile application. In related embodiments of the system, the mobile application is further configured to, in response to receiving the digital resource credentials, communicate the digital resource credentials to the digital storage. In still further specific related embodiments of the system, the digital storage is further configured to, in response to receiving the digital resource credentials, communicate the digital resource credentials to a digital resource network and, in response to communicating the digital resource credentials to the digital resource network, receive and store a token associated with the digital resource credentials.

A mobile communication device for real-time provisioning of a digital resource to a digital storage defines second embodiments of the invention. The mobile communication device includes a computing platform having a memory and a processor in communication with the memory. The mobile communication device additionally includes a mobile application stored in the memory, executable by the processor and configured to, in response to receiving a provisioning command communicated from a digital resource provisioning module, receive an input from a user that prompts the digital resource provisioning module to provision the digital resource to a digital storage associated with the user.

In specific embodiments the mobile communication device further includes a digital storage that is stored in the memory and executable by the processor. The digital storage is configured to, in response to the second input from the user at the mobile application, provide for activation of the digital resource on the digital storage.

In other specific embodiments of the mobile communication device, the mobile application is further configured to, in response to determining that the user is not enrolled for use of the mobile application, request user input of an authorization code. In related embodiments of the invention, the mobile application is further configured to, in response to determining that the user is not currently enrolled to use the mobile application, receive the second input, which includes the authorization code and at least one user credential, from the user. In still further embodiments of the mobile communication device, in response to successful verification of the authorization code and the user credential, provisioning of the digital resource is initiated by the digital resource provisioning module to the digital storage.

In other specific embodiments of the mobile communication device, the mobile application is further configured to, in response to receiving the second input, receive digital resource credentials associated with the digital resource and communicate the digital resource credentials to a digital storage. In related embodiments of the mobile communication device, the digital storage is further configured to, in response to receiving the digital resource credentials, communicate the digital resource credentials to a digital resource network and, in response to communicating the digital resource credentials to the digital resource network, receive and store a token associated with the digital resource credentials.

Thus, systems, apparatus, methods, and computer program products herein described in detail below provide for real-time automated provisioning of a digital resource on a digital storage. Such real-time provisioning provides the user with instantaneous access to digital resources associated and use of the digital resource. In addition, by providing for such provisioning in real-time fashion, unnecessary costs associated with provisioning the digital resources through an exception flow and expediting delivery of the digital resource are avoided. Moreover, the present invention providers for a highly secure means of provisioning the digital resource, in that, the provisioning occurs absent the user having possession or knowledge of the digital resource credentials.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
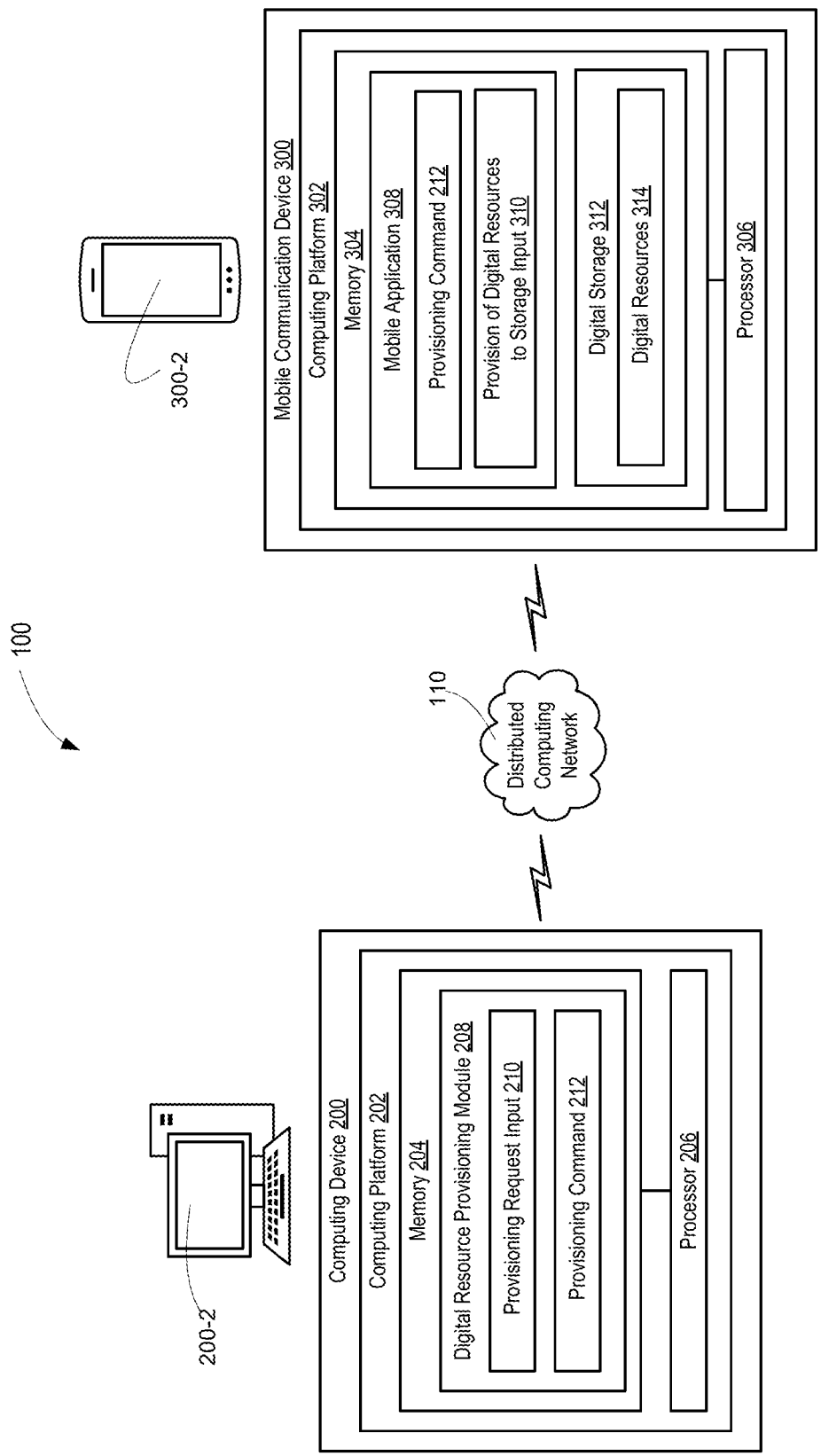
Figure 2:
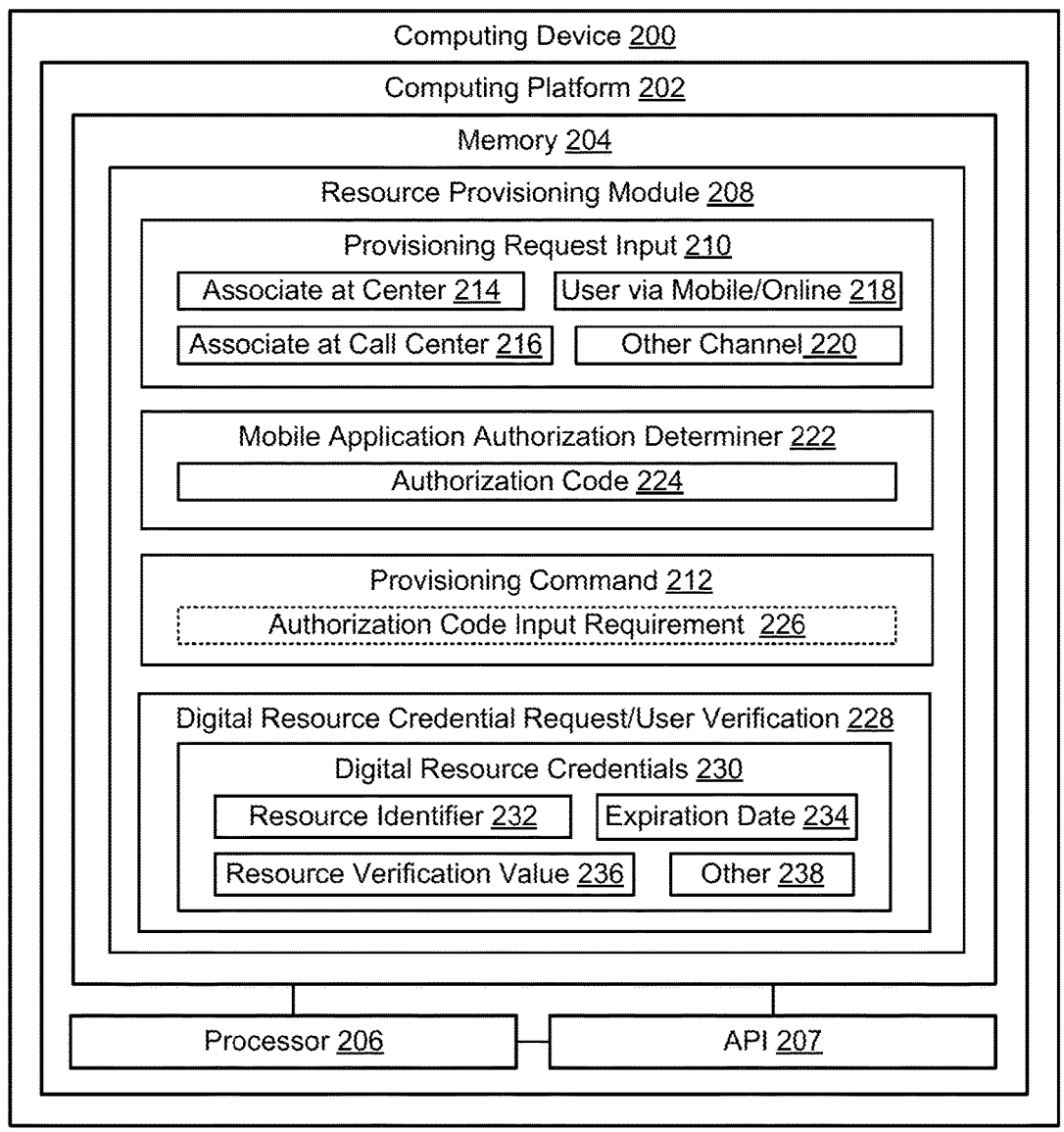
Figure 3:
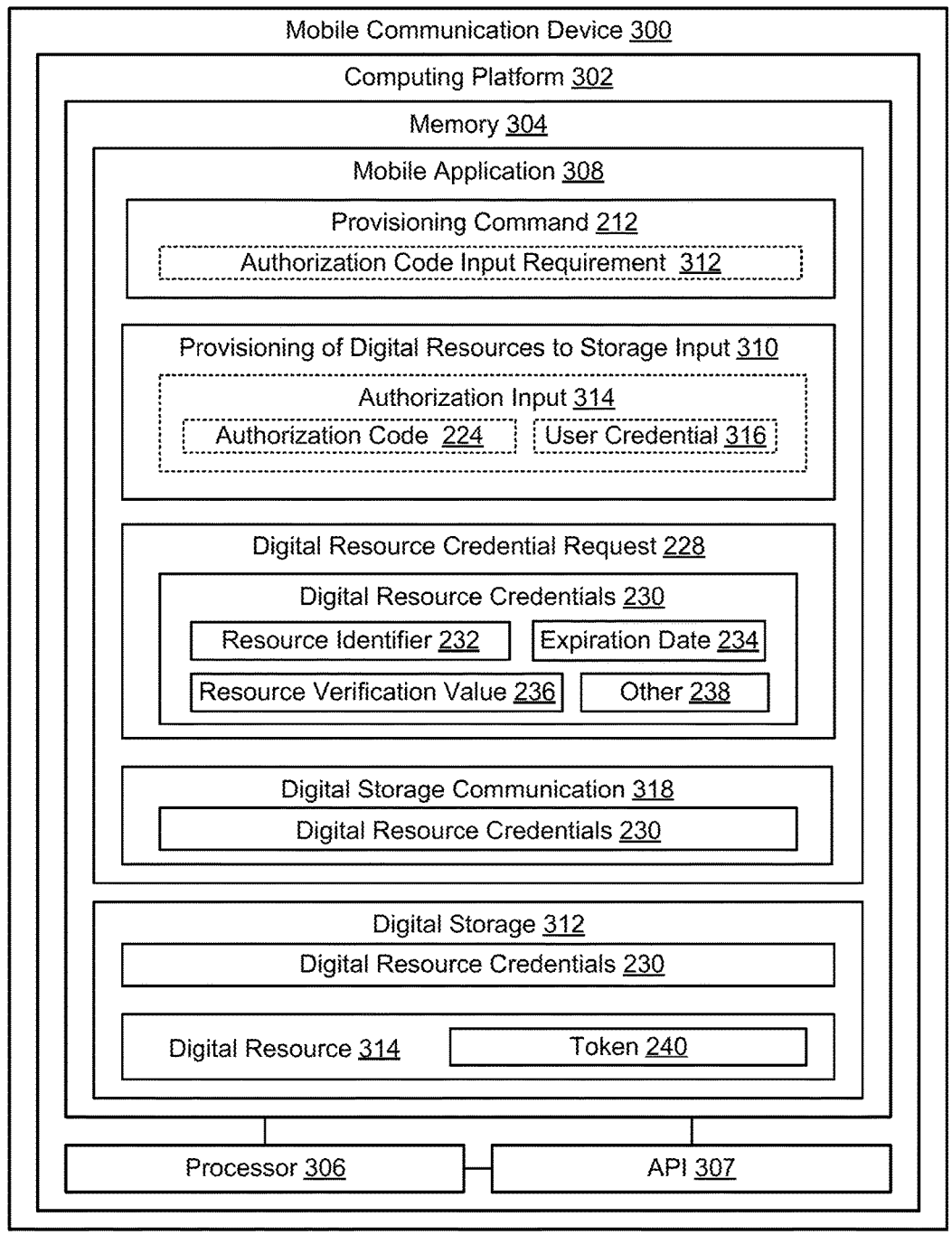
Figure 4:
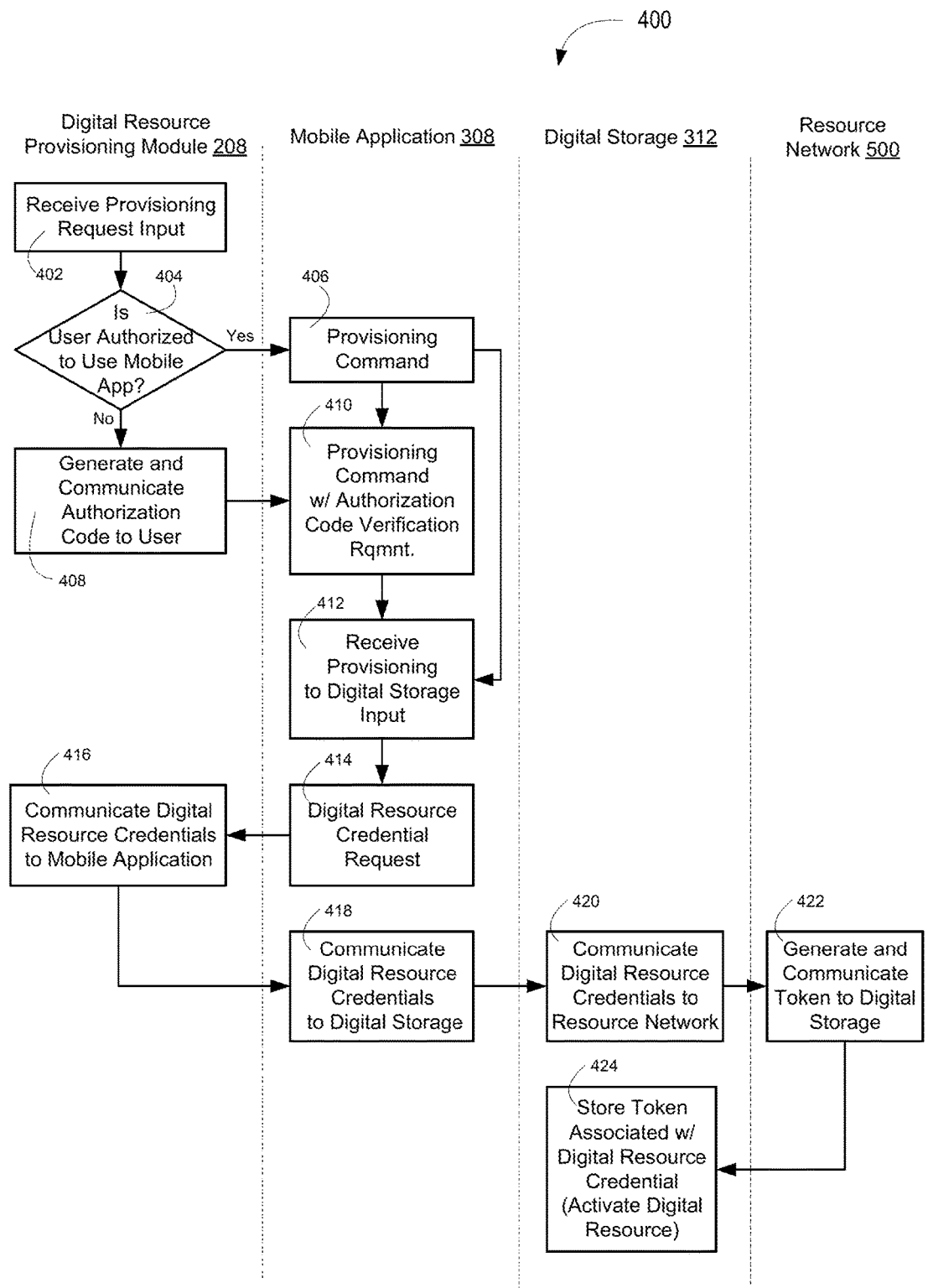

Having thus described embodiments of the invention in general terms, reference will now be made the accompanying drawings, wherein:

FIG. 1 provides a block diagram of a system for real-time digital provisioning of a digital resource, in accordance with embodiments of the present invention;

FIG. 2 provides a block diagram of a computing device configured for executing a digital resource provisioning module in accordance with embodiments of the present invention, in accordance with embodiments of the present invention;

FIG. 3 provides a block diagram of a mobile communication device configured for provisioning a digital resource to a digital storage via a mobile application, in accordance with embodiments of the present invention; and FIG. 4 provides a flow diagram of a method for real-time issuance/provisioning of a digital resource to digital storage, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal allocation. Like numbers refer to like elements throughout.

As will be appreciated by one of skill in the art in view of this disclosure, the present invention may be embodied as an apparatus (e.g., a system, computer program product, and/or other device), a method, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as JAVA, PERL, SMALLTALK, C++ or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or apparatuses (the term "apparatus" including systems and computer program products). It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

Thus, embodiments of the present invention address the above needs and/or achieve other advantages by providing for real-time digital issuance of digital resources, such as but, not limited digital payment cards, e.g., credit/debit cards. Real-time provisioning of the digital resource occurs through a user's access to a mobile application. As such, by having the provisioning occur electronically via the mobile application, increased security measures are realized, in that, provisioning occurs without the user having physically possession or knowledge of the digital resource's credentials.

In specific embodiments of the invention, in the event that the user is not enrolled or otherwise currently authorized to use the mobile application, the user is provided with an authorization code, which they are required to input, typically along with some form of user credentials, in order to verify their identity for the purpose of provisioning the digital resource to their digital storage. The authorization code provides a short-cut for the user, in which the user is not required to enroll in mobile/online services in order to automatically provision/activate the digital resource on the user's digital storage.

Once the user has accessed the mobile application and requested provisioning of the digital resource to their storage, the digital resource credentials are communicated to the mobile application, which in turn communicates the digital resource credentials to the digital storage. The digital storage communicates the digital resource credentials to a digital resource network, which issues and communicates a token associated with the card credentials to the digital storage that serves to activate the digital resource for use.

Referring to FIG. 1, a block diagram is shown of a system 100 for real-time issuance/provisioning of digital resources, in accordance with embodiments of the present invention. The system comprises a computing device 200 and mobile communication device 300 that are in network communication via distributed computing network 110, which may comprise one or more public networks, such as the Internet and/or one or more private networks, such as intranets or the like.

The computing device 200 may take the form of a personal computer 200-2 or any other computing device configured to execute routines, applications, modules or the like, such as, but not limited to, a server, a laptop computer, a tablet computer, a mobile computing device and the like. The computing device 200 includes a computing platform 202 having a memory 204 and a processor 206 in communication with the memory. The memory 204 of computing device 200 stores digital resource provisioning module 208 that is executable by processor 206 and is configured to receive a provisioning request input 210 and, in response to receiving the input 210, generate and communicate a provisioning command 212 to a mobile communication application 308 associated with the user (i.e., digital resource requester). In specific embodiments of the invention, the digital resource provisioning module 208 is a digital card provisioning module.

In specific embodiments of the system, the provisioning request input 210 may be received from a digital resource provider associate or the user/requester. For example, a digital resource provider associate located at a digital resource provider facility may receive a request from a user/requester, either in-person or via electronic communication (e.g., call-center) or a user/request may input a request, electronically, online, via a mobile application or the like.

The mobile communication device 300 may take the form of a smart telephone 300-2 or any other portable computing device configured to execute routines, applications, modules or the like, such as, but not limited to, a laptop computer, a table computer, a wearable computing device or the like. The mobile communication device 300 includes a computing platform 302 having a memory 304 and a processor 306 in communication with the memory. The memory 304 of computing device 300 stores mobile application 308 that is executable by processor 306 and is configured to receive the provisioning command 212 from the digital resource provisioning module 208 and, in response to receiving the command receive an input 310 that initiates provisioning of the digital resource 314 to a digital storage 312. In specific embodiments of the invention, the digital resource 314 is a digital card and the digital storage 312 is a digital wallet. In this regard, the mobile application 308, which may be the mobile application of the digital resource provider, serves to verify the identity of the digital resource requester/user. In those embodiments of the system, in which the user/requester has previously enrolled as a user of the mobile application 312 or has otherwise electronically enrolled or been authorized as a user by the digital resource provider and has provided user credentials to the mobile application as a means of user verification, the input 310 may comprise the user's acceptance of initiating the provisioning of the digital resource 314 to the digital storage 316. In other embodiments of the invention, in which the user/requester is not currently enrolled as a mobile application user, the input 310 may comprise an authorization code, provided to the user/requester by the digital resource provider at the time of the digital resource request, and, in some embodiments, other user credentials (e.g., passcode, biometrics or the like) as a means of verifying the identity of the user/requester prior to initiating the provisioning of the digital resource 314 to the digital storage 316. By implementing the mobile application 308 as a provisioning platform, the present invention eliminates the need for the user/requester to physically possess or otherwise have knowledge of the digital resource credentials (e.g., in those embodiments in which the digital resource is a digital card, the digital card credentials may include, but are not limited to, card/account number, expiration date and/or card verification value (CVV)) prior to activation of the digital resource 314 on the digital storage 312.

As previously noted, memory 304 of mobile communication device 300 additionally stores digital storage 312 that is executable by the processor 306 and configured to, in response to the mobile application 308 receiving the input 310, provide for activation of the digital resource on the digital storage.

Referring to FIG. 2 a more detailed block diagram is presented of the computing device 200, in accordance with additional embodiments of the invention. In addition to providing more detail, FIG. 2 provides various optional embodiments of the computing device. As previously noted, the computing device 200 includes a computing platform 202 that can execute algorithms, such as modules, routines, applications and the like. Computing platform 202 includes memory 204, which may comprise volatile and non-volatile memory, such as read-only and/or random-access memory (RAM and ROM), EPROM, EEPROM, flash cards, or any memory common to computer platforms). Moreover, memory 204 may comprise cloud storage, such as provided by a cloud storage service and/or a cloud connection service.

Further, computing platform 202 also includes processor 206, which may be an application-specific integrated circuit ("ASIC"), or other chipset, logic circuit, or other data processing device. Processor 206 may execute an application programming interface ("API") 207 that interfaces with any resident programs, such as digital resource provisioning module 208 and sub-routines associated therewith or the like stored in the memory 204 of the computing device 200.

Processor 206 may include various processing subsystems (not shown in FIG. 2) embodied in hardware, firmware, software, and combinations thereof, that enable the functionality of computing device 200 and the operability of the computing device 200 on a network. For example, processing subsystems allow for initiating and maintaining communications and exchanging data with other networked devices. For the disclosed aspects, processing subsystems of processor 206 may include any subsystem used in conjunction with digital resource provisioning module 208 and related sub-routines, algorithms, sub-algorithms, modules, sub-modules thereof.

Computer platform 202 may additionally include a communications module (not shown in FIG. 2) embodied in hardware, firmware, software, and combinations thereof, that enables electronic communications between the computing device and mobile communication device 300 (shown in FIG. 1). Thus, communication module may include the requisite hardware, firmware, software and/or combinations thereof for establishing and maintaining a network communication connection.

Memory 204 of computing device 200 stores digital resource provisioning module 208 that is configured to implement processor 206 to receive a provisioning request input 210 and, in response to receiving the input 210, generate and communicate a provisioning command 212 to a mobile communication application 308 (shown in FIG. 1) associated with the user (i.e., digital resource requester).

In specific embodiments of the system, the provisioning request input 210 may be received from a digital resource provider associate or the user/requester. For example, the input 210 may be received from a digital resource provider associate located at a digital resource provider facility 214 (e.g., financial institution center) or at a call center 216. Additionally, the input 210 may be received from a user/requester, electronically, via a mobile application/online service 218. In other embodiments of the invention, the input 210 may be received at any other known or future known communication channel 220.

In specific embodiments of the invention, the digital resource provisioning module 208 further includes mobile application authorization determiner 222 that is configured to, in response to receiving the input 210, determine if the user/requester is currently enrolled/authorized for use of the mobile application (308 of FIG. 1). In the event that mobile application authorization determiner 222 determines that that the user/requester is not currently enrolled/authorized for use of the mobile application, the digital provisioning module 208 generates an authorization code 224 and initiates communication of the authorization code 224 to the user/requester. As will be discussed in more detail, infra., the authorization code 224 is implemented by the mobile application as a means of verifying the identity of the user/requester in lieu of having the user/requester enroll with the mobile application or some other card provider service (e.g., online service or the like). In those embodiments in which an authorization code 224 is generated, the provisioning command 212 is configured to include an authorization code input requirement 226, which configures the mobile application 308 to require the user/requester to input the authorization code 224 as part of the process for initiating provisioning of the digital resource on the digital storage.

In response to the user/requester providing input 310 (shown in FIG. 1) to the mobile application, the digital resource provisioning module 208 is configured to receive digital resource credential request (and/or a user/requester verification) 228 from either the mobile application 308 or an authentication/verification entity and, in response to receiving either the digital resource credential request 228 and/or a user/requester verification 228, communicate digital resource credentials 230 to the mobile application 308. In those embodiments of the invention in which the digital resource comprises a card, the digital resource card credentials may include, but are necessarily limited to, the digital resource identifier/number 232, expiration date 234, digital resource verification value 236 and any other digital resource credential 238.

Referring to FIG. 3 a more detailed block diagram is presented of the mobile communication device 300, in accordance with additional embodiments of the invention. In addition to providing more detail, FIG. 3 provides various optional embodiments of the mobile communication device 300. As previously noted, the mobile communication device 300 includes a computing platform 302 that can execute algorithms, such as modules, routines, applications and the like. Computing platform 302 includes memory 304, which may comprise volatile and non-volatile memory, such as read-only and/or random-access memory (RAM and ROM), EPROM, EEPROM, flash cards, or any memory common to computer platforms). Moreover, memory 304 may comprise cloud storage, such as provided by a cloud storage service and/or a cloud connection service.

Further, computing platform 302 also includes processor 306, which may be an application-specific integrated circuit ("ASIC"), or other chipset, logic circuit, or other data processing device. Processor 306 may execute an application programming interface ("API") 307 that interfaces with any resident programs, such as mobile application 308, digital storage 312 and sub-routines associated therewith or the like stored in the memory 304 of the mobile communication device 300.

Processor 306 may include various processing subsystems (not shown in FIG. 3) embodied in hardware, firmware, software, and combinations thereof, that enable the functionality of mobile communication device 300 and the operability of the mobile communication device 300 on a network. For example, processing subsystems allow for initiating and maintaining communications and exchanging data with other networked devices. For the disclosed aspects, processing subsystems of processor 306 may include any subsystem used in conjunction with mobile application 308, digital storage 312 and related sub-routines, algorithms, sub-algorithms, modules, sub-modules thereof.

Computer platform 302 may additionally include a communications module (not shown in FIG. 3) embodied in hardware, firmware, software, and combinations thereof, that enables electronic communications between the computing device 200 and mobile communication device 300 (shown in FIG. 1). Thus, communication module may include the requisite hardware, firmware, software and/or combinations thereof for establishing and maintaining a network communication connection.

Memory 304 of mobile communication device 300 stores mobile application 308 that is configured to implement processor 306 to receive a provisioning command 212 from the from the digital resource provisioning module (208 of FIGS. 1 and 2) and, in response to receiving the command receive an input 310 that initiates provisioning of the digital resource 314 to a digital storage 312. In this regard, the mobile application 308, which may be the mobile application of the digital resource provider, serves to verify the identity of the digital resource requester/user. In those embodiments of the system, in which the user/requester has previously enrolled as a user of the mobile application 312 or has otherwise electronically enrolled or been authorized as a user by the digital resource provider and has provided user credentials to the mobile application as a means of user verification, the input 310 may comprise the user's acceptance of initiating the provisioning of the digital resource 314 to the digital storage 316.

In other embodiments of the invention, in which the user/requester is not currently enrolled as a mobile application user, the input 310 may include an authorization input 314 which may comprise the authorization code 224, provided to the user/requester by the digital resource provider at the time of the digital resource request, and, in some embodiments, other user credentials 316 (e.g., passcode, biometrics or the like) as a means of verifying the identity of the user/requester prior to initiating the provisioning of the digital resource 314 to the digital storage 316.

Additionally, in response to receiving the input 310 that initiates provisioning of the digital resource 314 to the digital storage 312, the mobile application 308 sends a card credential request 228 to the digital resource provisioning module (208 of FIGS. 1 and 2) and, in response to the request 228, receives digital resource credentials 230. As previously noted the digital resource credentials 230 may include digital resource identifier/number 232, expiration date 234, digital resource verification value 236 and any other 238 digital resource-related data.

Additionally, memory 304 of mobile communication device 300 stores digital storage 312 that is executable by the processor 306 and configured to, in response to receiving the digital resource credentials 230 from the mobile application 308, communicate the digital resource credentials 230 to a digital resource network (not shown in FIG. 3), which issues a token 240 associated with the digital resource credentials 230 and communicates the token back to the digital storage. Once the token 240 is received by the digital storage 312, the digital resource 314 is effectively activated for use.

Referring to FIG. 4 a flow diagram is depicted of a method 400 for real-time issuance/provisioning of a digital resource, in accordance with embodiments of the present invention. The method is depicted in swim-lane format, based on actions occurring at the digital resource provisioning module 208 (within computing device 200 of FIGS. 1 and 2), mobile application 308, digital storage 312 and digital resource network 500.

At Event 402, a provisioning request input is received at the digital resource provisioning module and, at Decision 404, a determination is made as to whether the user/requester is enrolled/authorized to use a mobile application associated with the digital resource provisioning entity. If the user/requester is determined to not currently be enrolled/authorized to use the mobile application, at Event 408, an authorization code is generated and communicated to the user/requester and, at Event 410, a provisioning command is communicated to the mobile application that a requirement for authorization code input/validation. The authorization code allows the user/requester to access the mobile application, for the purpose of provisioning the digital resource to their digital storage, without having to first enroll or otherwise be authorized to use the mobile application.

If the user/requester is determined to be enrolled/authorized to use the mobile application, at Event 406, a provisioning command is communicated to the mobile application, which is configured to require the user/requester to access the mobile application and accept provisioning of the digital resource to their digital storage.

At Event 412, the mobile application receives a user/requester input that serves to provision the digital resource to the digital storage. In the event the user/requester is not currently enrolled/authorized to use the mobile application, the input will include the authorization code and, in some embodiments, other user credentials (e.g., passcode, biometrics), as a means of verifying the identity of the user/requester.

In response to receiving the input from the user/requester, at Event 414, the mobile application generates a digital resource credential request that is communicated to the digital resource provisioning module. In response to receiving the digital resource credential request, at Event 416, the digital resource provisioning module generates or otherwise accesses the digital resource credentials (e.g., digital resource identifier/number, expiration date, RVV and the like) and communicates digital resource credentials to the mobile application.

At Event 418, the mobile application communicates the digital resource credentials to the digital storage, which, at Event 420, communicates to a digital resource network. At Event 422, in response to receiving the digital resource credentials, the digital resource network generates a token associated with the digital resource credentials and communicates the token to the digital storage. The token serves as the digital means for wirelessly communicating the digital resources credentials at digital resource interface (e.g., in those embodiments in which the digital resource is a digital payment card, the digital resource interface may comprise a point-of-sale, Automated Teller Machine (ATM) or the like). At Event 424, the digital storage stores the token in memory, which serves to activate the digital resource for use.

Thus, systems, apparatus, methods, and computer program products described above provide for real-time automated provisioning of a digital resource on a digital storage. Such real-time provisioning provides the user with instantaneous access to and use of digital resources. In addition, by providing for such provisioning in real-time fashion, unnecessary costs associated with provisioning the digital resource through an exception flow and expediting delivery of a physical digital resource are avoided. Moreover, the present invention providers for a highly secure means of provisioning the digital resource, in that, the provisioning occurs absent the user having possession or knowledge of the card credentials (i.e., account/card number, expiration date and/or card verification value (CVV)) prior to the provisioning of the card to the digital storage.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for real-time provisioning of a digital resources, the system comprising:
a computing device comprising a first computing platform including a first memory and a first processor in communication with the memory;
a digital resource provisioning module stored in the memory, executable by the processor and configured to (i) receive a first input that requests real-time provisioning of a digital resources to a digital storage associated with a user, (ii) determine whether the user is currently authorized to use a mobile application that is configured for receiving the digital resources and storing digital resource in a digital storage, and (iii) in response to receiving the request and determining that the user is currently authorized to use the mobile application, communicate a provisioning command to a mobile application associated with the user;
a mobile communication device comprising a second computing platform including a second memory and a second processor in communication with the memory;
the mobile application stored in the second memory, executable by the second processor and configured to, in response to being receiving the provisioning command, receive a second input from the user that prompts the digital resource provisioning module to provision the digital resources to the digital storage, wherein based on determining that the user is currently authorized to use the mobile application, the second input does not include (i) an authorization code, and (ii) user credentials; and
the digital storage stored in the second memory, executable by the second processor and configured to, in response to receiving the second input from the user at the mobile application, store the digital resources and initiate activation of the digital resources.

2. The system of claim 1, wherein the digital resource provisioning module is further configured to (iv) in response to determining that the user is not currently authorized to use the mobile application, generate and an authorization code and communicate the authorization code with the provisioning command.

3. The system of claim 2, wherein the mobile application is further configured to (iv) in response to determining that the user is not currently authorized to use the mobile application, receive a third input from the user, wherein the third input includes the authorization code and at least one user credential, and (ii) communicate the authorization code and user credential to a verification entity.

4. The system claim 3, wherein the digital resource provisioning module is further configured to, in response to receiving notification of successful verification from the verification entity, initiate provisioning of the digital resource to the digital storage.

5. The system of claim 1, wherein the digital resource provisioning module is further configured, in response to receiving the second input at the mobile application, communicate digital resource credentials to the mobile application.

6. The system of claim 5, wherein the mobile application is further configured to, in response to receiving the digital resource credentials, communicate the digital resource credentials to the digital storage.

7. The system of claim 6, wherein the digital storage is further configured to, in response to receiving the digital resource credentials, communicate the digital resource credentials to a digital resource network and, in response to communicating the digital resource credentials to the digital resource network, receive and store a token associated with the digital resource credentials.

8. A mobile communication device for real-time provisioning of a digital resource to a digital storage, the system comprising:
a computing platform including a memory and a processor in communication with the memory;
a mobile application stored in the memory, executable by the processor and configured to, in response to receiving a provisioning command communicated from a digital resource provisioning module, receive an input from a user that prompts the digital resource provisioning module to provision the digital resource to a digital storage, wherein based on determining that the user is currently authorized to use the mobile application, the input does not include (i) an authorization code, or (ii) user credentials; and
a digital storage stored in the memory, executable by the processor and configured to, in response to receiving the second input from the user at the mobile application, store the digital resources and initiate activation of the digital resources on the digital storage.

9. The device of claim 8, wherein the mobile application is further configured to, in response to determining that the user is not authorized for use of the mobile application, request user input of an authorization code.

10. The device of claim 9, wherein the mobile application is further configured to in response to determining that the user is not currently authorized to use the mobile application, receive a second input from the user, wherein the second input includes the authorization code and at least one user credential.

11. The device claim 10, wherein, in response to successful verification of the authorization code and the user credential, provisioning of the digital resource is initiated by the digital resource provisioning module to the digital storage.

12. The device of claim 8, wherein the mobile application is further configured to, in response to receiving the input, receive digital resource credentials associated with the digital resource and communicate the digital resource credentials to the digital storage.

13. The device of claim 12, wherein the digital storage is further configured to, in response to receiving the digital resource credentials, communicate the digital resource credentials to a digital resource network and, in response to communicating the digital resource credentials to the digital resource network, receive and store a token associated with the digital resource credentials.

* * * * *